(12) United States Patent
Azizi et al.

(10) Patent No.: US 9,131,512 B2
(45) Date of Patent: Sep. 8, 2015

(54) METHODS AND ARRANGEMENTS TO MITIGATE COLLISIONS IN WIRELESS NETWORKS BY ENABLING COEXISTENCE OF DISPARATE BANDWIDTHS

(71) Applicant: Intel Corporation, Santa Clara, CA (US)

(72) Inventors: Shahrnaz Azizi, Cupertino, CA (US); Eldad Perahia, Portland, OR (US); Thomas J Kenney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 360 days.

(21) Appl. No.: 13/796,389

(22) Filed: Mar. 12, 2013

(65) Prior Publication Data

US 2014/0119280 A1     May 1, 2014

Related U.S. Application Data

(60) Provisional application No. 61/719,267, filed on Oct. 26, 2012.

(51) Int. Cl.
*H04W 74/08*     (2009.01)

(52) U.S. Cl.
CPC ................. *H04W 74/0816* (2013.01)

(58) Field of Classification Search
None
See application file for complete search history.

(56) References Cited

U.S. PATENT DOCUMENTS

| 2006/0068837 | A1 | 3/2006 | Malone |
| 2006/0146869 | A1 | 7/2006 | Zhang et al. |
| 2009/0279646 | A1 | 11/2009 | Kobayashi et al. |
| 2011/0317674 | A1 | 12/2011 | Park et al. |

OTHER PUBLICATIONS

Mingyoung Park, "Proposed Specfication Framework for TGah", IEEE 802.11-11/1 137r11, Sep. 2012, https://mentor.ieee.org/802.11/documents.
International Search Report and Written Opinion, mail date Oct. 15, 2013, PCT/ISA/210, PCT/ISA/220, and PCT/ISA/237, total of 10 pages.

*Primary Examiner* — Huy D Vu
*Assistant Examiner* — Bao G Nguyen
(74) *Attorney, Agent, or Firm* — Schwegman Lundberg & Woessner, P.A.

(57) ABSTRACT

Systems, devices, and methods for mitigating collisions between wireless transmissions operating at different bandwidths are disclosed. As such, a wireless device operating at a predefined bandwidth includes a transceiver that receives a signal across a wireless channel, a filter that generates a band-limited filtered signal at the predefined bandwidth of the wireless device, a correlating mechanism that correlates the band-limited filtered signal with a delayed, conjugated version of the band-limited filtered signal, logic that performs a moving average of the correlated filtered signals to determine correlation peaks, and logic configured to compare the correlation peaks with a predetermined threshold. With this configuration, if the correlation peaks are greater than the predetermined threshold, the received signal is determined to operate at a wider bandwidth than the predefined bandwidth of the wireless device, and the wireless device defers accessing the wireless channel to transmit until a predetermined time interval.

20 Claims, 5 Drawing Sheets

METHODS AND ARRANGEMENTS TO MITIGATE COLLISIONS IN WIRELESS NETWORKS BY ENABLING COEXISTENCE OF DISPARATE BANDWIDTHS

CROSS REFERENCE TO RELATED APPLICATIONS

The present Patent Application is based on, and claims priority to, U.S. Provisional Patent Application No. 61/719,267 filed on Oct. 26, 2012, the entire content of which is hereby incorporated by reference.

TECHNICAL FIELD

This disclosure relates generally to the field of wireless communications.

BACKGROUND ART

Recently, standards such as, for example, IEEE 802.11ah, have been proposed that provide a framework for low power, lower bandwidth, broad coverage wireless communication systems. Such systems have a wide variety of applications and services such as, for example, sensing and tracking of the usage of electricity, water, gas, and/or other utilities, monitoring healthcare-related issues and events, etc. These applications and services generally require much lower data rates and much lower power consumption than conventional wireless communication systems, such as, for example, wireless systems operating in accordance with traditional IEEE 802.11-based standards.

However, in an effort to accommodate diverse wireless systems directed to similar low power, lower bandwidth operations, the recently proposed standards have adopted disparate frequency bandwidths.

DETAILED DESCRIPTION

Figure 1:
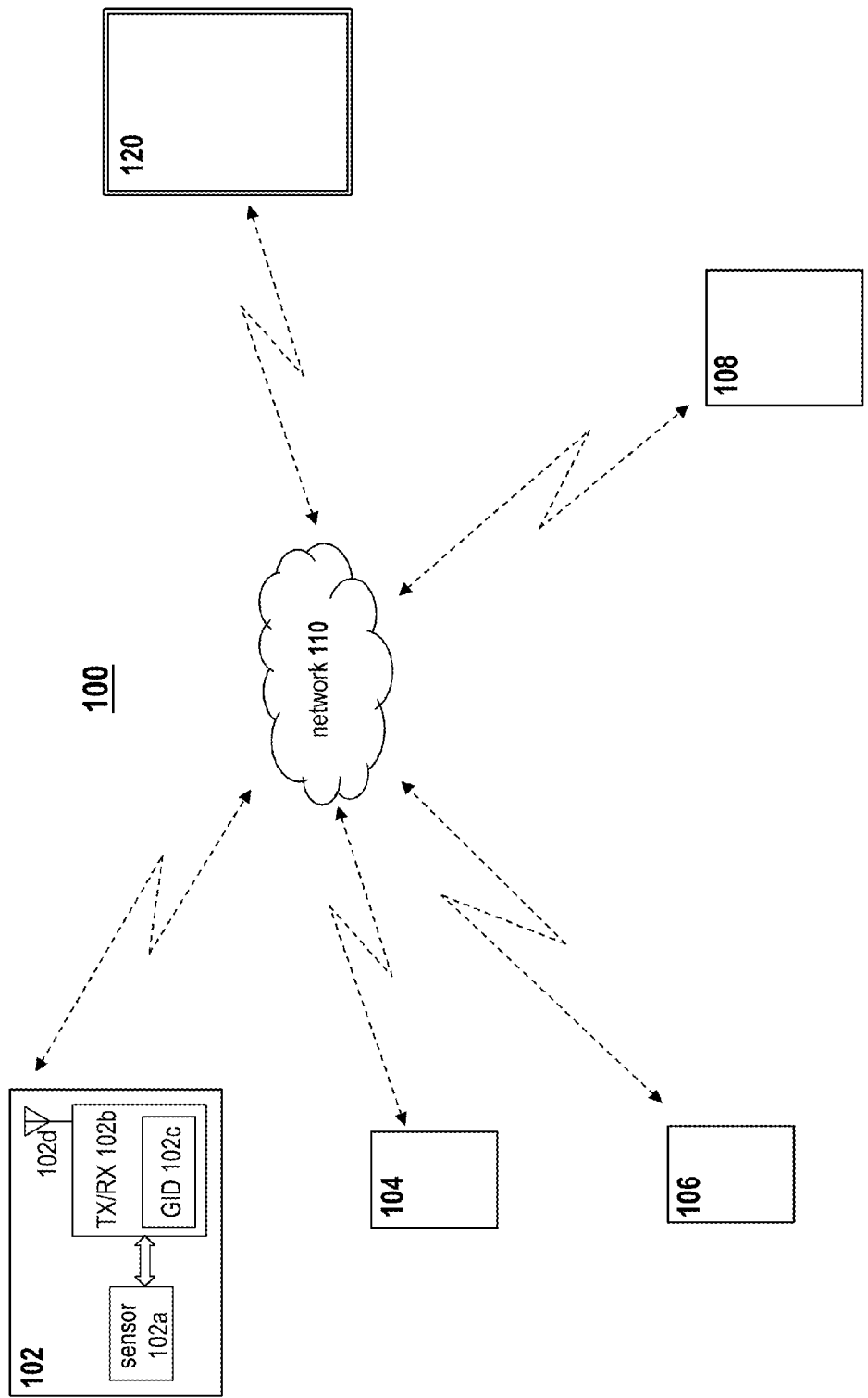
FIG. 1 depicts a wireless communication system, in accordance with various aspects and principles of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, what is proposed is a wireless system that mitigates collisions between wireless transmissions operating at different bandwidths. The system includes a wireless device configured to operate at a predefined bandwidth, which includes a transceiver configured to receive a signal across a wireless channel; a filter configured to filter the receive signal and generate a band-limited filtered signal at the predefined bandwidth of the wireless device; a correlating mechanism configured to correlate the band-limited filtered signal with a delayed, conjugated version of the band-limited filtered signal; logic configured to perform a moving average of the correlated filtered signals to determine correlation peaks; and logic configured to compare the correlation peaks with a predetermined threshold. Moreover, if the correlation peaks are greater than the predetermined threshold, the received signal is determined to operate at a wider bandwidth than the predefined bandwidth of the wireless device. And, upon determining that the received wireless signal operates at the wider bandwidth, the wireless device defers accessing the wireless channel to transmit until a predetermined time interval.

In another embodiment, a detection scheme is presented that mitigates collisions between wireless transmissions operating at different bandwidths. The detection scheme includes receiving a signal across a wireless channel by a wireless device operating at a predefined bandwidth; filtering the received signal to generate a band-limited filtered signal at the predefined bandwidth of the wireless device; correlating the band-limited filtered signal with a delayed, conjugated version of the band-limited filtered signal; performing a moving average of the correlated filtered signals to determine correlation peaks; comparing the correlation peaks with a predetermined threshold; and determining that the received signal operates at a wider bandwidth than the predefined bandwidth of the wireless device, if the correlation peaks are greater than the predetermined threshold. Moreover, upon determining that the received wireless signal operates at the wider bandwidth, the wireless device defers accessing the wireless channel to transmit until a predetermined time interval.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

The inventors have observed that the proposed framework accommodating systems operating with disparate bandwidths run the risk of transmission collisions, as larger bandwidth operations may overlap smaller bandwidth channels. Thus, what is proposed in this disclosure is a detection scheme that makes use of Guard Interval (GI) of an Orthogonal Frequency-Division Multiplexing (OFDM) symbol to detect the GI of a larger bandwidth signal within the smaller signal bandwidth. Upon detection of the larger bandwidth signal, communication devices operating on the smaller signal bandwidth are capable of recognizing the ongoing transmission of the larger bandwidth signals and would defer their transmissions. Such a technique enables the coexistence of larger operating bandwidths with smaller operating bandwidths by effectively avoiding collisions.

With this said, FIG. 1 depicts a non-limiting example of wireless communication system 100, in accordance with various aspects and principles of the present disclosure. Wireless system 100 represents a coexistent architecture having the capability of servicing disparate operating bandwidths, for example, a smaller bandwidth channel (e.g., 1 MHz) and a larger bandwidth channel (e.g., 2 MHz) while avoiding transmission collisions. As described in greater detail below, wireless system 100 is capable of accommodating communications between communication devices 102, 104, 106, and 108 and remote entity 120, via network 110, in which communication channels may operate under disparate bandwidths.

As used herein, the term "network" refers to a wireless communication network that may be utilized in example implementations as discussed below. The network may be configured to operate under a variety of wireless communication protocols and standards, such as, for example, Wi-Fi, WiMax, WWAN, WLAN, WPAN, Bluetooth, GSM, CDMA, GPRS, 3G or 4G, LTE, Wireless USB, IEEE 802.11-based standards, or any other implementation of a suitable wireless standard. As such, wireless communications is not limited to any specific standard and the examples discussed may be implemented separately or in combination with each other. Moreover, network 110 may represent an interconnection of a number of networks. For instance, the network 110 may couple with a wide area network such as the Internet or an intranet and may interconnect local devices wired or wirelessly interconnected via one or more hubs, routers, or switches. In the present embodiment, network 110 communicatively couples communication devices 102, 104, 106, and 108, and entity 120.

While the wireless communications is not limited to any specific standard and the examples discussed may be implemented separately or in combination with each other, for the sake of tractability and clarity, it will be appreciated that the embodiments described heretofore will be directed to lower data rate, low power, IEEE 802.11ah-based wireless systems. For example, embodiments directed to IEEE 802.11ah-based wireless systems may comprise indoor/outdoor "smart" grid and sensor services that facilitate the exchange/transfer of utility usage data (e.g., electricity, water, gas, etc.) with a provider, such as, for example, entity 110. Other embodiments may include sensor data for home healthcare, clinics, or hospitals that monitor healthcare-related events and vital signs such as, for example, fall detection, medication monitoring, weight monitoring, sleeping disorders, blood sugar levels, heart rhythms, etc.

Moreover, wireless communication devices 102, 104, 106, and 108 may take a number of forms, such as, for example, sensors, integrated utility/home monitors, stations, access points, hubs, switches, routers, laptops, mobile devices, cellular/smartphones, gaming devices tablet computers, wireless-enabled patient monitoring devices, personal communication system (PCS) devices, personal digital assistants (PDAs), personal audio devices (PADs), portable navigational devices, and/or any other electronic wireless-enabled device configured to receive a wireless signal. However, again for the sake of tractability and clarity, the embodiments described heretofore will be directed to relatively low data rate, low power sensors/stations, consistent with the lower data rate, low power, IEEE 802.11ah-based wireless systems.

Returning to FIG. 1, wireless communication devices 102, 104, 106, and 108 of system 100 may include sensor, antenna, transceiver, and guard interval detection capabilities. For example, in the depicted embodiment, wireless communication device 102 comprises antenna portion 102$d$, sensor mechanism 102$a$, transceiver portion 102$b$, and Guard Interval Detection (GID) mechanism 102$c$.

Sensor mechanism 102$a$ may be any device configured to track or otherwise determine the use or consumption of utility-provided resources, such as, for example, electricity, water, gas, sewage, etc. Sensor mechanism 102$a$ may comprise a sensing element and may include analog interface circuitry, analog-to-digital converters (ADCs), digital processing and storage, and a bus interface.

Sensor mechanism 102$a$ may further be configured to provide such utility-based information to transceiver portion 102$b$ for communications processing and, ultimately, transmission. Transceiver portion 102$b$ may be configured to perform RF transmission and/or reception operations. As such, transceiver portion 102$b$ may comprise modulators/demodulators, encoders/decoders, dynamic random access memory (DRAM), oscillators, filtering circuitry, synchronization circuitry, multiple frequency conversion stages, multiple amplification stages, etc. In addition, transceiver portion 102$b$ may be communicatively coupled to antenna portion 102$d$ which is configured radiate an RF information-bearing signal bearing as well as intercept such a signal. As is well known, antenna portion 102$d$ may take a variety of forms, such as, for example, of microstrips, striplines, slotlines, patches, etc.

Transceiver portion 102$b$ may also include multiplexers/demultiplexers to achieve multiplexing operations. In some embodiments, consistent with IEEE 802.11ah-based wireless standards, transceiver portion 102$b$ is configured to implement orthogonal frequency-division multiplexing (OFDM), in which digital data is encoded on multiple orthogonal sub-carrier frequencies. Each OFDM symbol includes Guard Intervals (GIs) or Cyclic Prefixes (CPs) which are provided by repeating a portion of their signals. In particular, an OFDM symbol may be 32 μsec long, so that either ¼th or ⅛th of the signal may be copied and inserted in front of the transmission as a CP and referred to as Long GI (LGI) or Short GI (SGI), respectively.

Transceiver portion 102$b$ may further include GID mechanism 102$c$ which, as discussed below, is configured to exploit the use of Guard Intervals (GIs) or cyclic prefixes (CPs) in OFDM symbols in order to enable narrower bandwidth receivers to effectively detect wider bandwidth transmissions.

By way of illustration, and in no way limiting, an overview of system 100 in accordance with various embodiments, will be described in view of the elements and functionality noted thus far. Generally speaking, sensors of communication wireless communication devices 102, 104, and 106 (e.g., sensor mechanism 102$a$ of device 102), may determine utility consumption data and forward the data to their respective transceivers (e.g., transceiver portion 102$b$). In turn, the transceivers of wireless communication devices 102, 104, and 106 may report such data to communication device 108 via a wireless channel operating on a prescribed RF band (e.g., 1 MHz). In so doing, wireless communication devices 102, 104, and 106 may periodically initiate a low power, lower data rate communication session with communication device 108 under the prescribed band.

In the illustrated embodiment, communication device 108 may be configured to operate as a collection station for aggregating the data received from devices 102, 104, and 106 and for subsequently forwarding the aggregated data to provider entity 120 via a wider RF band channel (e.g., 2 MHz). It is to be noted that communication device 108 may also operate to determine utility consumption data and forward its own data to provider entity 120.

Alternately or in addition to, wireless communication devices 102, 104, 106 and station 108 may individually forward consumption data to provider entity 120 and may equally communicate with each other. For example, wireless communication devices 102, 104, 106, and 108 may periodically initiate communications with each other and/or provider entity 120 to conduct system-based administrative functions, such as, for example, firmware updates, data offloading, system synchronization, testing, failover processing, etc.

Given the above illustrative example, it will be appreciated that, because communication devices 102, 104, 106, and 108 of system 100 may communicate with each other as well as provider entity 120, they may do so via wireless channels operating under different bandwidths. As such, the risk of transmission collisions exist, as larger bandwidth transmissions may overlap and/or interfere with smaller bandwidth transmissions.

To this end, transceiver portion 102b further includes GID mechanism 102c which, as discussed below, is configured to exploit the use of Guard Intervals (GIs) or Cyclic Prefixes (CPs) of OFDM symbols in order to enable narrower bandwidth receivers to effectively detect wider bandwidth transmissions. That is, as noted in the non-limiting examples presented above, system 100 comprises a coexistent architecture having the capability of servicing disparate operating bandwidths, for example, a smaller bandwidth channel (e.g., 1 MHz) and a larger bandwidth channel (e.g., 2 MHz). For example, wireless communication device 108 of system 100 may be configured to operate with 2 MHz bandwidth signal (i.e., 2 MHz-enabled device) while wireless communication devices 102, 104, 106 may operate with 1 MHz bandwidth signal (i.e., 1 MHz-enabled devices).

With such a coexistent bandwidth architecture, certain transmission rules for the 1 MHz bandwidth signal may be employed, given the proposed lower data rate and low power attributes of IEEE 802.11ah-based standards. For example, for 2 MHz basic service set (BSS), the 1 MHz bandwidth signal may only be allowed at the lower 1 MHz band of the 2 MHz bandwidth. For a 4/8/16 MHz BSS, when the primary 2 MHz is at lowermost portion of the overall band, the 1 MHz bandwidth signal may only be allowed at the upper side of the 2 MHz primary channel, while when the primary 2 MHz is at an uppermost portion of the overall band, the 1 MHz bandwidth signal may only be allowed at the lower side of the 2 MHz primary channel.

In view of the coexistent architecture of system 100 as well as with the transmission rules for the 1 MHz bandwidth signal, it will be appreciated that a 2 MHz-enabled device may be capable of receiving 1 MHz signals by filtering either of its sub-channels. It should also be appreciated that a 2 MHz-enabled device may be capable of detecting 1 MHz transmissions by performing Clear Channel Assessment (CCA) procedures on the specified lower/upper part of its bandwidth to detect if the channel is busy and/or detect energy in the channel, prior to starting its transmission, in order to avoid collisions.

In contrast, however, 1 MHz-enabled devices typically employ a 1 MHz band RF front-end and, therefore, may not be able to receive and examine a full 2 MHz bandwidth signal. This may be particularly problematic, as the 2 MHz signal may not be a duplication of two 1 MHz signals. To combat such issues, GID mechanism 102c of transceiver portion 102b exploits the GI or CP properties of OFDM symbols to enable narrower bandwidth receivers, such as 1 MHz-enabled devices, to effectively detect ongoing transmissions of wider bandwidth signals on a wireless channel and take appropriate action to avoid transmission collisions.

Figure 2:
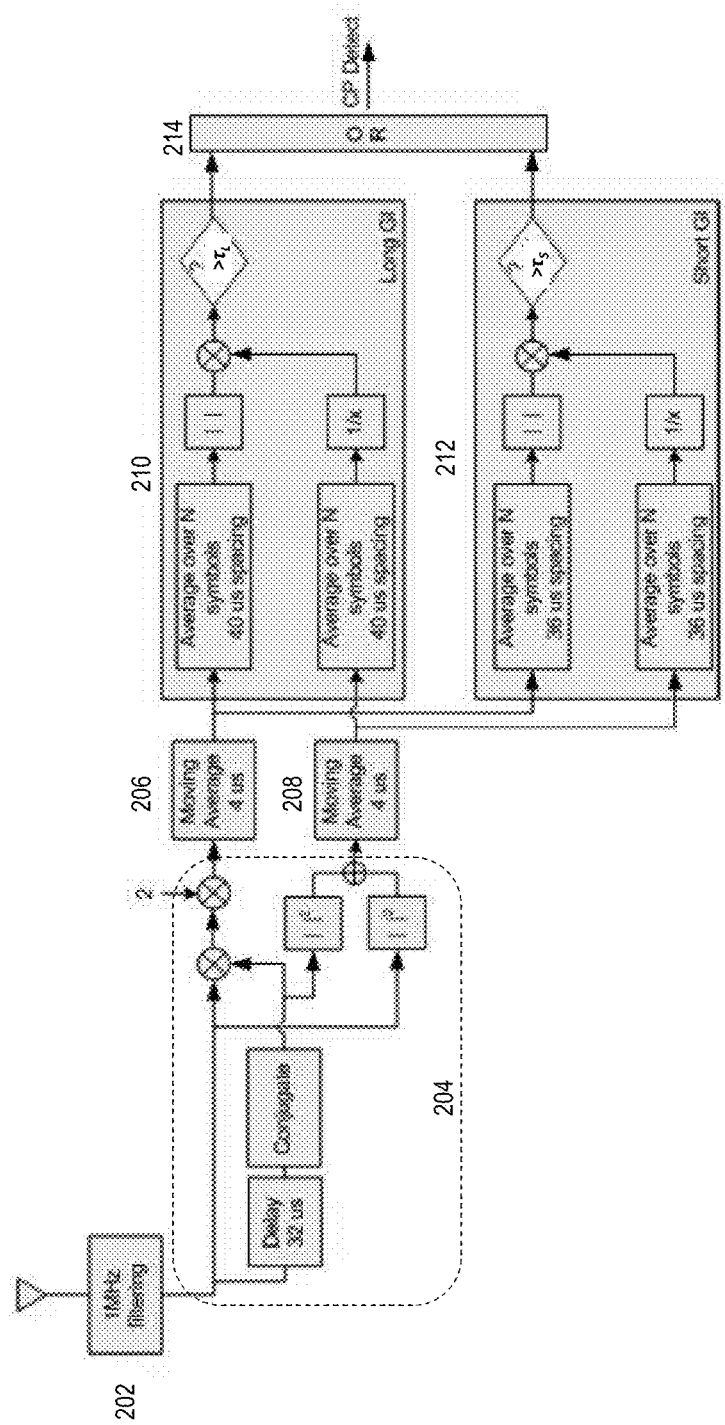
FIG. 2 depicts an embodiment of a detection mechanism that enables coexistence of disparate bandwidth signals, in accordance with various aspects and principles of the present disclosure.

FIG. 2 illustrates a functional block diagram of GI detection mechanism 200 that may be incorporated into a narrower bandwidth communication device, such as, for example, 1 MHz-enabled communication device 102, in accordance with various aspects and principles of the present disclosure. As noted above, OFDM symbols repeat a portion of their signals (i.e., GI) such that, if OFDM symbols are 32 μsec long, either ¼th or ⅛th of the signal is copied and inserted in front of the transmission to provide a Long GI (LGI) or Short GI (SGI). Upon detection of such repetition, the 1 MHz-enabled devices equipped with GI detection mechanism 200 is capable of recognizing ongoing OFDM 2 MHz transmissions and defers its transmission to avoid collisions with the 2 MHz transmission.

As depicted in FIG. 2, GI detection mechanism 200 incorporates an RF front end filter 202 to band-limit the received transmission to a 1 MHz filtered signal. The front end filter 202 may comprise analog and/or digital filtering circuits or mechanisms. The 1 MHz filtered signal and a delayed, conjugate version of the 1 MHz filtered signal are mixed by correlator portion 204. The delay may be configured to be 32 μsec long, nominally the duration of an OFDM symbol prior to GI insertion.

In some embodiments, correlator portion 204 may include an upper branch configured to detect Long GI transmissions and a lower branch configured to detect Short GI transmissions. In addition, correlator portion 204 may further include a magnitude portion configured to normalized the detect statistic for the hypothesis test. This allows a threshold to be set irrespective of receiver configuration (AGC, gain stages, and the like) or the received SNR.

The correlated signals are then subjected to a moving average by modules 206, 208 to identify similarities between the correlated signals over a 4 μsec window. The similarities may be identified by the evidence of correlation peaks.

After identifying the similarities, the averaged correlated peaks are inputted to long GI (LGI) and short GI (SGI) detectors 210, 212. For example, in concert with the proposed IEEE 802.11ah-based standards, LGI may be configured with a duration of 40 μsec while SGI may last 36 μsec. In so doing, LGI detector 210 averages the symbols over a 40 μsec interval and compares the correlation peaks with threshold value $\tau_L$, while SGI detector 312 averages the symbols over a 36 μsec interval and compares the correlation peaks with threshold value $\tau_S$.

If the correlation peaks of either LGI detector 210 or SGI detector 212 are greater than their respective thresholds, $\tau_L$, $\tau_S$, then it can be inferred that such correlation peaks are due to the repetitive nature of the CPs in the GIs of OFDM symbols. Thus, the transmission initially received by GI detection mechanism 200 may be determined to be a 2 MHz transmission that is currently occupying the channel. In response thereto, communication device 102 may defer its attempt to seize the channel and transmit, until a predetermined time interval, in other words, such time as the 2 MHz transmission may be complete.

Figure 3:
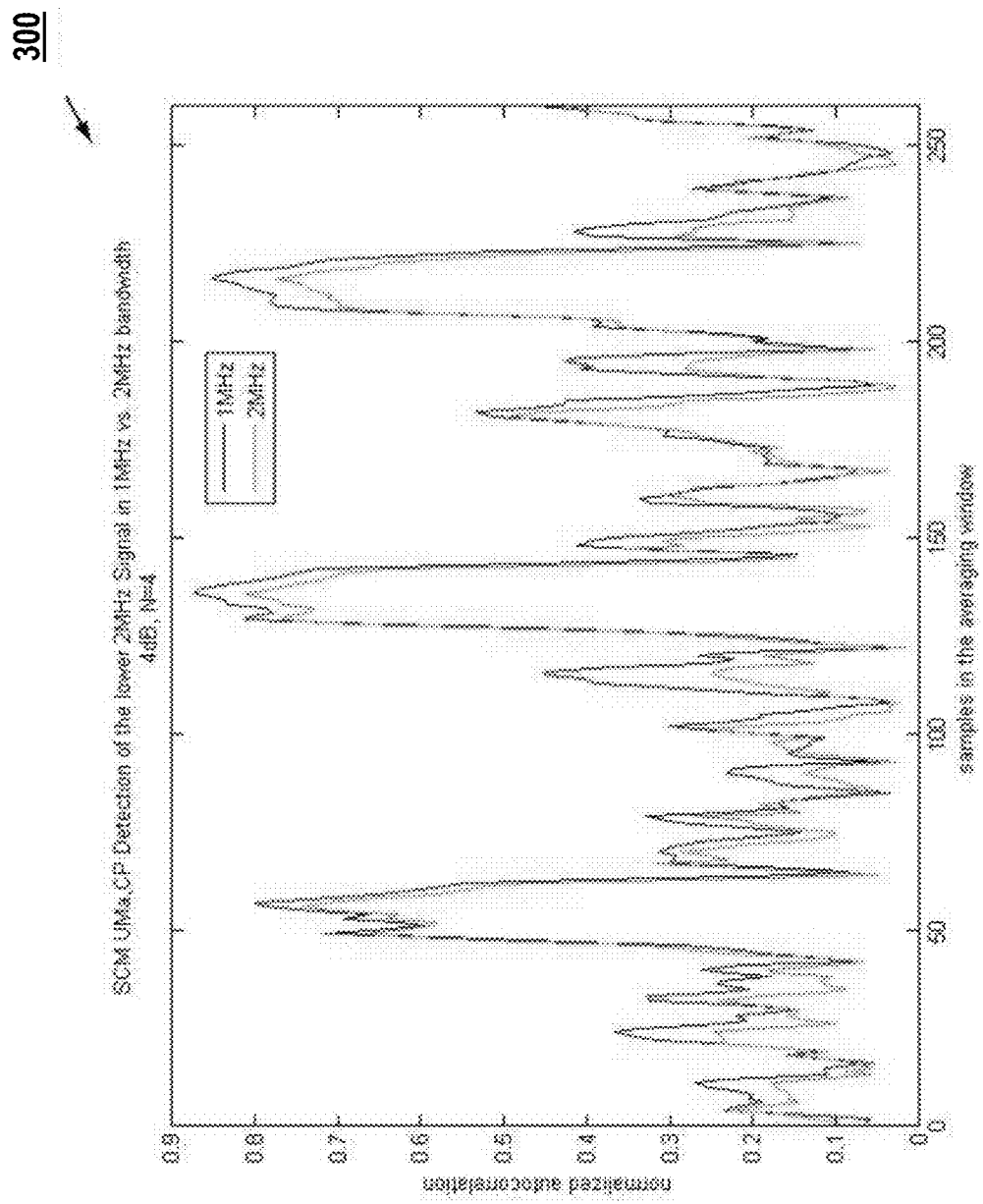
FIGS. 3-4 depict results of simulations of a detection mechanism, in accordance with various aspects and principles of the instant disclosure.
Figure 4:
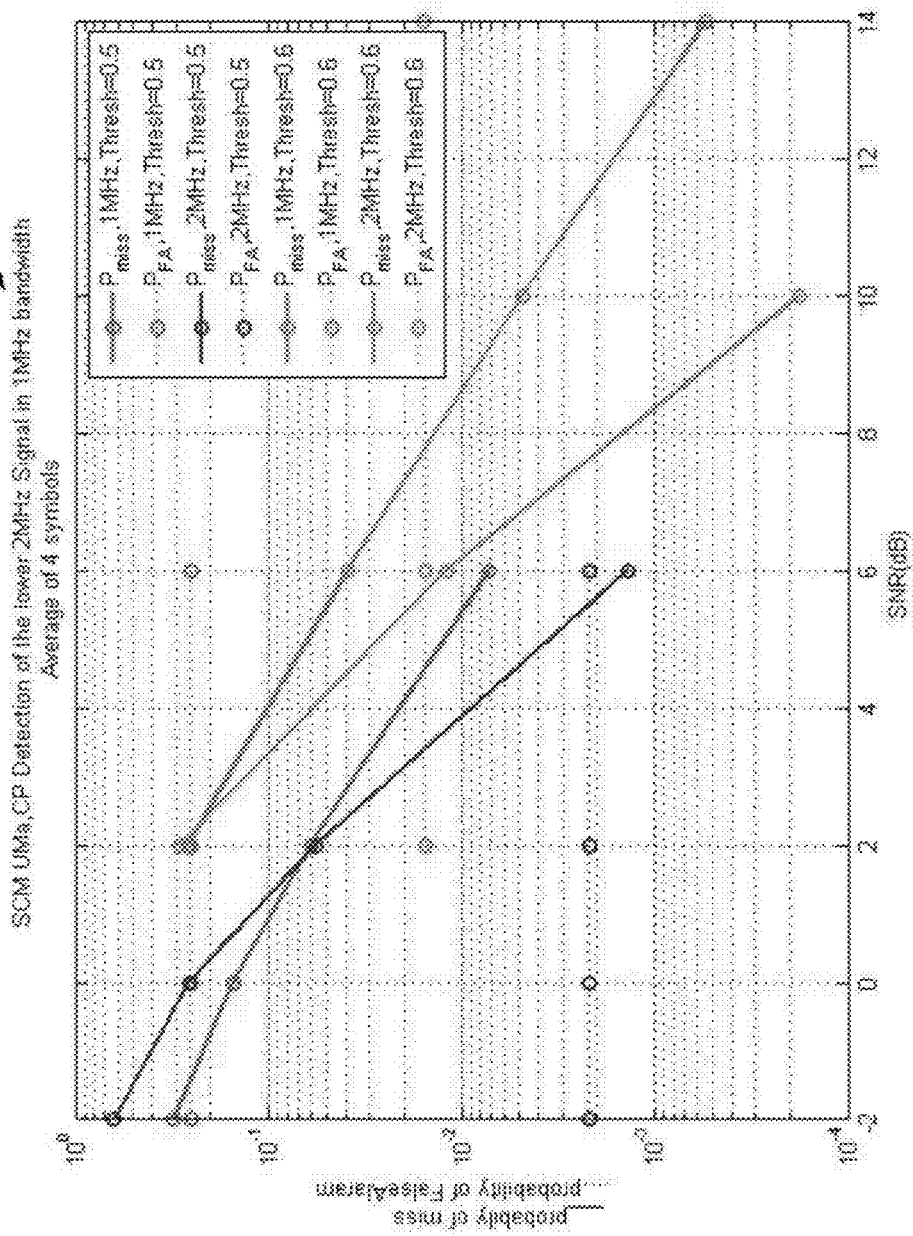

FIGS. 3, 4 depict simulation results of GI detection mechanism 200, in accordance with various aspects and principles of the instant disclosure. FIG. 3 illustrates the comparisons of the output of the normalized correlation after averaging over N=4 symbols for 1 MHz and 2 MHz receivers. As expected, the 2 MHz receiver exhibits smoother output than the 1 MHz receiver which will result in lower false alarm rates at a given signal-to-noise (SNR) and probability of detection. It will be appreciated that 1 MHz receiver observes sharp peaks by which it can detect the 2 MHz signal. The simulation case was for a 2 MHz transmission in using the spatial channel model (SCM) UMa channel with all simulation impairments and a carrier offset of −13.675 ppm.

FIG. 4 illustrates the comparison of detection performance of the 2 MHz receiver to the 1 MHz receiver. It shows that the 1 MHz receiver can achieve greater than 10% probability of detection at SNR=4 dB with the probability of false alarm being almost equal to 1%, while 2 MHz receiver achieves similar probability of detection at much lower probability of false alarm (i.e., it is zero for the presented simulation case that contained around 16000 random 2 MHz transmission). These results confirm the expectation that the GI detection in the 1 MHz receiver suffers from filtering half of the 2 MHz bandwidth, yet it meets acceptable probability of false alarm of about 1%.

FIG. 4 also shows that use of a threshold=0.5 provides 10% detection rate at lower SNRs for the 2 MHz receiver, while 1 MHz receiver fails at this threshold due to probability of false alarm of about 30%. Fortunately, the lowest operating point for 2 MHz transmission for BPSK rate ½ in SCM UMa channel is at an SNR of about 3 dB, and hence use of threshold=0.5 is not needed.

Figure 5:
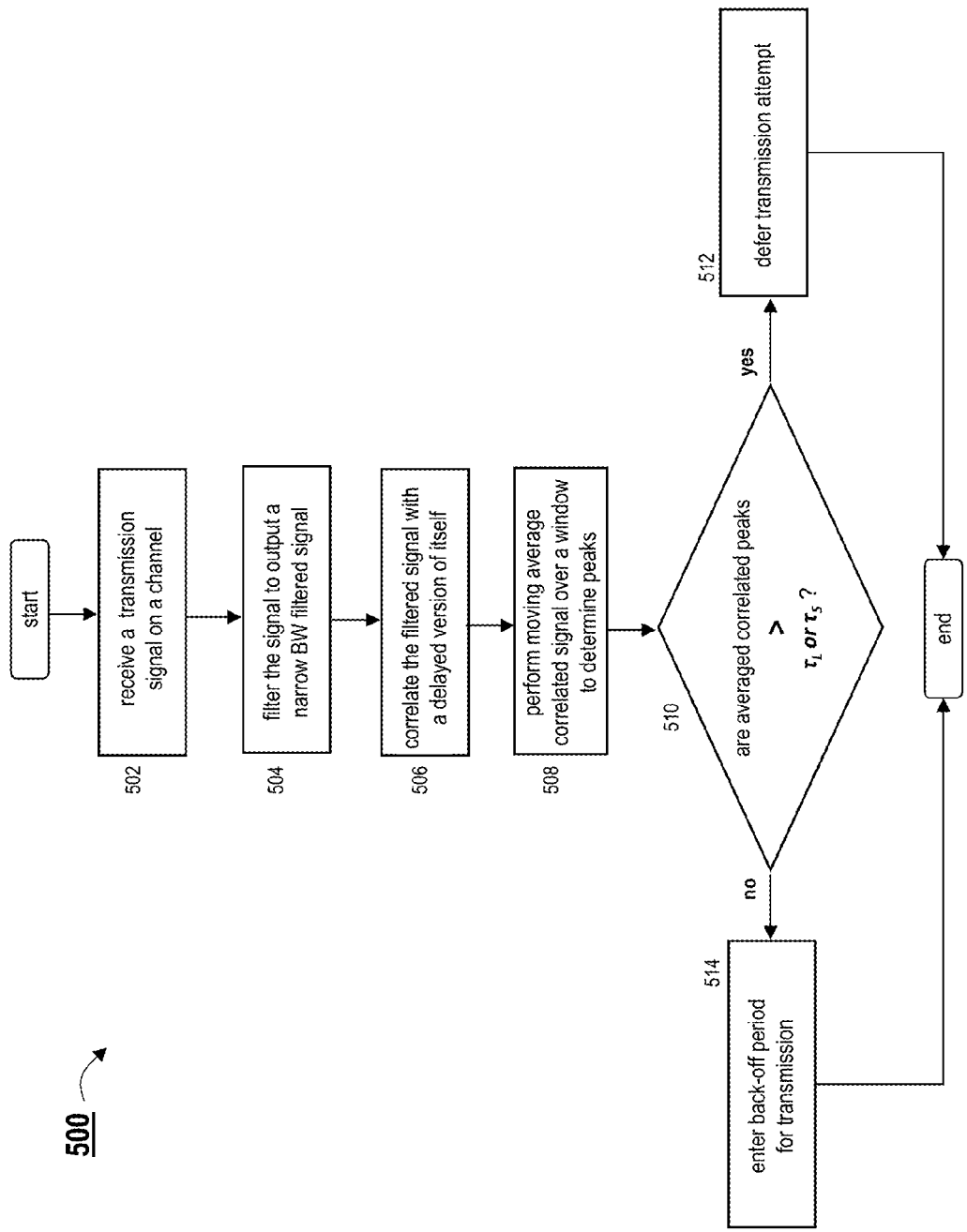
FIG. 5 depicts a flowchart of a detection scheme that enables coexistence of disparate bandwidth signals, in accordance with various aspects and principles of the instant disclosure.

FIG. 5 depicts a flowchart of GI detection scheme 500 that exploits the use of GIs or CPs in OFDM symbols to detect wider bandwidth transmissions by a narrower bandwidth receiver, in accordance with various aspects and principles of the instant disclosure. It will be appreciated that GI detection scheme 500 may operate in conjunction with, or independently of, GID 200.

Initially at block 502, GI detection scheme 500 initiates 1 MHz-enabled communication device 120 to scan the wireless channel prior to transmission to determine if the channel is clear prior to transmission and may, in response, receive a transmission that may or may not be a 2 MHz OFDM signal. At block 504, scheme 500 filters the transmitted signal into to a 1 MHz band-limited filtered signal. At block 506, the 1 MHz filtered signal and a 32 µsec delayed, conjugate version of the 1 MHz filtered signal are correlated. Then, at block 506, a moving average is performed over a 4 µsec window to determine correlation peaks.

At block 508 of detection scheme 500, the averaged correlated peaks are compared to both LGI detector threshold value $\tau_L$ and SGI detector threshold value $\tau_S$. If the averaged correlation peaks are greater than either of thresholds, $\tau_L$, $\tau_S$, then at block 512, detection scheme 500 determines that the correlation peaks are due to a 2 MHz OFDM transmission that is currently occupying the channel. As noted above, communication device 102 will accordingly defer its attempt to seize the channel for transmission, until a predetermined time interval in which the 2 MHz transmission may be complete.

However, if the averaged correlation peaks are not greater than thresholds, $\tau_L$, $\tau_S$, then at block 514, communication device 102 will prepare to access the channel for transmitting by entering into a random back-off period. Generally, the random back-off period, which is a function of random number and time slot, forces a wireless device to wait for a randomized period of time after sensing that the channel is idle and available, thereby providing a random delay to the device seizing the channel and transmitting. This technique minimizes collisions with other wireless devices that have also sensed the channel is idle and are waiting to capture the channel as well.

In this manner, a detection mechanism and scheme are presented that enables a narrower-band device to effectively detect ongoing transmissions of wider bandwidth signals on a channel to avoid collisions and facilitate the coexistence of disparate operating bandwidths.

EXAMPLES

The following examples pertain to numerous embodiments, consistent with the various aspects and principles of the present disclosure.

Example 1 is a method of mitigating collisions between wireless transmissions operating at different bandwidths that provides receiving a signal across a wireless channel by a wireless device operating at a predefined bandwidth; filtering the received signal to generate a band-limited filtered signal at the predefined bandwidth of the wireless device; correlating the band-limited filtered signal with a delayed, conjugated version of the band-limited filtered signal; performing a moving average of the correlated filtered signals to determine correlation peaks; comparing the correlation peaks with a predetermined threshold; and determining that the received signal operates at a wider bandwidth than the predefined bandwidth of the wireless device, if the correlation peaks are greater than the predetermined threshold, wherein, upon determining that the received wireless signal operates at the wider bandwidth, the wireless device defers accessing the wireless channel for transmitting until a predetermined time interval.

In Example 2, the subject matter of Example 1 may optionally provide determining that the received signal operates at the predefined bandwidth of the wireless device, if the correlated peaks are not greater than the predetermined threshold. And, in Example 3, the subject matter of Example 2 may optionally provide that the wireless device prepares to access the wireless channel for transmitting, upon determining that the received signal operates at the predefined bandwidth of the wireless device.

In Example 4, the subject matter of Example 1 may optionally provide that the received signal comprises a 2 MHz bandwidth signal while in Example 5, the subject matter of Example 1 may optionally provide that the predefined bandwidth of the wireless device is 1 MHz. In addition, in Example 6, the subject matter of Example 4 may optionally provide that the filtering of the signal comprises band-limiting the 2 MHz bandwidth signal to a 1 MHz bandwidth.

In Example 7, the subject matter of Example 1 may optionally provide that the correlating comprises correlating the filtered signal against a 32 µsec delayed conjugated version of the filtered signal and in Example 8, the moving average of the correlated filtered signal is performed over a 4 µsec window.

In Example 9, the subject matter of Example 1 may optionally provide that the correlated peaks being greater than the predetermined threshold indicate that the received signal comprises an orthogonal frequency division multiplexing (OFDM) signal having cyclic prefixes (CPs) as guard intervals (GIs) and in Example 10, the subject matter of Example 9 may in turn optionally provide that the predetermined threshold comprises a first value for a long GI and a second value for a short GI.

Example 11 is a wireless system for mitigating collisions between wireless transmissions operating at different bandwidths that comprises a wireless device configured to operate at a predefined bandwidth, the wireless device including: a transceiver configured to receive a signal across a wireless channel; a filter configured to filter the receive signal and generate a band-limited filtered signal at the predefined bandwidth of the wireless device; a correlating mechanism configured to correlate the band-limited filtered signal with a delayed, conjugated version of the band-limited filtered signal; logic configured to perform a moving average of the correlated filtered signals to determine correlation peaks; and logic configured to compare the correlation peaks with a predetermined threshold, wherein, if the correlation peaks are greater than the predetermined threshold, the received signal is determined to operate at a wider bandwidth than the predefined bandwidth of the wireless device, and wherein, upon determining that the received wireless signal operates at the wider bandwidth, the wireless device defers accessing the wireless channel for transmitting until a predetermined time interval.

In Example 12, the subject matter of Example 11 may optionally include that if the correlated peaks are not greater than the predetermined threshold, determining that the received signal operates at the predefined bandwidth of the wireless device. And, in Example 13, the subject matter of Example 12 may optionally include that the wireless device prepares to access the wireless channel for transmitting, upon determining that the received signal operates at the predefined bandwidth of the wireless device.

In Example 14, the subject matter of Example 11 may optionally include that the received signal comprises a 2 MHz bandwidth signal while in Example 15, the subject matter of Example 11 may optionally provide that the predefined bandwidth of the wireless device is 1 MHz. In addition, in Example 16, the subject matter of Example 14 may optionally include that the filtering of the signal comprises band-limiting the 2 MHz bandwidth signal to a 1 MHz bandwidth.

In Example 17, the subject matter of Example 11 may optionally include that the correlating mechanism comprises correlating the filtered signal against a 32 μsec delayed conjugated version of the filtered signal and in Example 18, that averaging logic of the correlated filtered signal is performed over a 4 μsec window.

In Example 19, the subject matter of Example 11 may optionally provide that the correlated peaks being greater than the predetermined threshold indicate that the received signal comprises an orthogonal frequency division multiplexing (OFDM) signal having cyclic prefixes (CPs) as guard intervals (GIs) and in Example 20, the subject matter of Example 19 may in turn optionally provide that the predetermined threshold comprises a first value for a long GI and a second value for a short GI.

Example 21 is a computer-readable medium comprising computer-readable instructions physically embodied thereon which, when executed by a processor, causes the processor to perform a method that provides receiving a signal across a wireless channel by a wireless device operating at a predefined bandwidth; filtering the received signal to generate a band-limited filtered signal at the predefined bandwidth of the wireless device; correlating the band-limited filtered signal with a delayed, conjugated version of the band-limited filtered signal; performing a moving average of the correlated filtered signals to determine correlation peaks; comparing the correlation peaks with a predetermined threshold; and determining that the received signal operates at a wider bandwidth than the predefined bandwidth of the wireless device, if the correlation peaks are greater than the predetermined threshold, wherein, upon determining that the received wireless signal operates at the wider bandwidth, the wireless device defers accessing the wireless channel for transmitting until a predetermined time interval.

In Example 22, the subject matter of Example 21 may optionally provide determining that the received signal operates at the predefined bandwidth of the wireless device, if the correlated peaks are not greater than the predetermined threshold. And, in Example 23, the subject matter of Example 22 may optionally provide that the wireless device prepares to access the wireless channel for transmitting, upon determining that the received signal operates at the predefined bandwidth of the wireless device.

In Example 24, the subject matter of Example 21 may optionally provide that the received signal comprises a 2 MHz bandwidth signal while in Example 25, the subject matter of Example 21 may optionally provide that the predefined bandwidth of the wireless device is 1 MHz. In addition, in Example 26, the subject matter of Example 24 may optionally provide that the filtering of the signal comprises band-limiting the 2 MHz bandwidth signal to a 1 MHz bandwidth.

In Example 27, the subject matter of Example 1 may optionally provide that the correlating comprises correlating the filtered signal against a 32 μsec delayed conjugated version of the filtered signal and in Example 28, the moving average of the correlated filtered signal is performed over a 4 μsec window.

In Example 29, the subject matter of Example 21 may optionally provide that the correlated peaks being greater than the predetermined threshold indicate that the received signal comprises an orthogonal frequency division multiplexing (OFDM) signal having cyclic prefixes (CPs) as guard intervals (GIs) and in Example 30, the subject matter of Example 29 may in turn optionally provide that the predetermined threshold comprises a first value for a long GI and a second value for a short GI.

Example 31 is a method of mitigating collisions between wireless transmissions operating at different bandwidths that provides receiving a signal across a wireless channel by a wireless device operating at a predefined bandwidth; filtering the received signal to generate a band-limited filtered signal at the predefined bandwidth of the wireless device; correlating the band-limited filtered signal with a delayed, conjugated version of the band-limited filtered signal; performing a moving average of the correlated filtered signals to determine correlation peaks; comparing the correlation peaks with a predetermined threshold; and determining that the received signal operates at a wider bandwidth than the predefined bandwidth of the wireless device, if the correlation peaks are greater than the predetermined threshold, wherein, upon determining that the received wireless signal operates at the wider bandwidth, the wireless device defers accessing the wireless channel for transmitting until a predetermined time interval.

In Example 32, the subject matter of Example 31 may optionally provide determining that the received signal operates at the predefined bandwidth of the wireless device, if the correlated peaks are not greater than the predetermined threshold. And, in Example 33, the subject matter of Example 32 may optionally provide that the wireless device prepares to access the wireless channel for transmitting, upon determining that the received signal operates at the predefined bandwidth of the wireless device.

In Example 34, the subject matter of Example 31 may optionally provide that the received signal comprises a 2 MHz bandwidth signal while in Example 35, the subject matter of Example 31 may optionally provide that the predefined bandwidth of the wireless device is 1 MHz. In addition, in Example 36, the subject matter of Example 34 may optionally provide that the filtering of the signal comprises band-limiting the 2 MHz bandwidth signal to a 1 MHz bandwidth.

In Example 37, the subject matter of Example 31 may optionally provide that the correlating comprises correlating the filtered signal against a 32 μsec delayed conjugated version of the filtered signal and in Example 38, the moving average of the correlated filtered signal is performed over a 4 μsec window.

In Example 39, the subject matter of Example 31 may optionally provide that the correlated peaks being greater than the predetermined threshold indicate that the received signal comprises an orthogonal frequency division multiplexing (OFDM) signal having cyclic prefixes (CPs) as guard intervals (GIs) and in Example 40, the subject matter of Example 9 may in turn optionally provide that the predetermined threshold comprises a first value for a long GI and a second value for a short GI.

Example 41 is a wireless system for mitigating collisions between wireless transmissions operating at different bandwidths that comprises a wireless device configured to operate at a predefined bandwidth, the wireless device including: a transceiver configured to receive a signal across a wireless channel; a filter configured to filter the receive signal and generate a band-limited filtered signal at the predefined bandwidth of the wireless device; a correlating mechanism configured to correlate the band-limited filtered signal with a delayed, conjugated version of the band-limited filtered signal; logic configured to perform a moving average of the correlated filtered signals to determine correlation peaks; and logic configured to compare the correlation peaks with a predetermined threshold, wherein, if the correlation peaks are greater than the predetermined threshold, the received signal is determined to operate at a wider bandwidth than the predefined bandwidth of the wireless device, and wherein, upon determining that the received wireless signal operates at the wider bandwidth, the wireless device defers accessing the wireless channel for transmitting until a predetermined time interval.

In Example 42, the subject matter of Example 41 may optionally include that if the correlated peaks are not greater than the predetermined threshold, determining that the received signal operates at the predefined bandwidth of the wireless device. And, in Example 43, the subject matter of Example 42 may optionally include that the wireless device prepares to access the wireless channel for transmitting, upon determining that the received signal operates at the predefined bandwidth of the wireless device.

In Example 44, the subject matter of Example 41 may optionally include that the received signal comprises a 2 MHz bandwidth signal while in Example 45, the subject matter of Example 41 may optionally provide that the predefined bandwidth of the wireless device is 1 MHz. In addition, in Example 46, the subject matter of Example 44 may optionally include that the filtering of the signal comprises band-limiting the 2 MHz bandwidth signal to a 1 MHz bandwidth.

In Example 47, the subject matter of Example 41 may optionally include that the correlating mechanism comprises correlating the filtered signal against a 32 μsec delayed conjugated version of the filtered signal and in Example 48, that averaging logic of the correlated filtered signal is performed over a 4 μsec window.

In Example 49, the subject matter of Example 41 may optionally provide that the correlated peaks being greater than the predetermined threshold indicate that the received signal comprises an orthogonal frequency division multiplexing (OFDM) signal having cyclic prefixes (CPs) as guard intervals (GIs) and in Example 50, the subject matter of Example 19 may in turn optionally provide that the predetermined threshold comprises a first value for a long GI and a second value for a short GI.

Example 51 is computer-readable medium comprising computer-readable instructions physically embodied thereon which, when executed by a processor, causes the processor to perform the method of any of claims 31-39.

Example 52 is an apparatus comprising means for performing the method of claims 31-39.

Example 53 is a method of mitigating collisions between wireless transmissions operating at different bandwidths that provides receiving a signal across a wireless channel by a wireless device operating at a predefined bandwidth; filtering the received signal to generate a band-limited filtered signal at the predefined bandwidth of the wireless device; correlating the band-limited filtered signal with a delayed, conjugated version of the band-limited filtered signal; performing a moving average of the correlated filtered signals to determine correlation peaks; comparing the correlation peaks with a predetermined threshold; determining that the received signal operates at a wider bandwidth than the predefined bandwidth of the wireless device, if the correlation peaks are greater than the predetermined threshold, wherein the wireless device defers accessing the wireless channel for transmitting until a predetermined time interval; determining that the received signal operates at the predefined bandwidth of the wireless device, if the correlated peaks are not greater than the predetermined threshold, wherein the wireless device prepares to access the channel for transmitting.

In Example 54, the subject matter of Example 53 may optionally provide that the received signal comprises a 2 MHz bandwidth signal while in Example 55, the subject matter of Example 53 may optionally provide that the predefined bandwidth of the wireless device is 1 MHz. In addition, in Example 56, the subject matter of Example 44 may optionally provide that the filtering of the signal comprises band-limiting the 2 MHz bandwidth signal to a 1 MHz bandwidth.

In Example 57, the subject matter of Example 53 may optionally provide that the correlating comprises correlating the filtered signal against a 32 μsec delayed conjugated version of the filtered signal and in Example 58, the moving average of the correlated filtered signal is performed over a 4 μsec window.

In Example 59, the subject matter of Example 53 may optionally provide that the correlated peaks being greater than the predetermined threshold indicate that the received signal comprises an orthogonal frequency division multiplexing (OFDM) signal having cyclic prefixes (CPs) as guard intervals (GIs) and in Example 60, the subject matter of Example 59 may in turn optionally provide that the predetermined threshold comprises a first value for a long GI and a second value for a short GI.

Example 61 is a wireless system for mitigating collisions between wireless transmissions operating at different bandwidths that comprises a wireless device configured to operate at a predefined bandwidth, the wireless device including: a transceiver configured to receive a signal across a wireless channel; a filter configured to filter the receive signal and generate a band-limited filtered signal at the predefined bandwidth of the wireless device; a correlating mechanism configured to correlate the band-limited filtered signal with a delayed, conjugated version of the band-limited filtered signal; logic configured to perform a moving average of the correlated filtered signals to determine correlation peaks; and logic configured to compare the correlation peaks with a predetermined threshold, wherein, if the correlation peaks are greater than the predetermined threshold, the received signal is determined to operate at a wider bandwidth than the predefined bandwidth of the wireless device, and the wireless device defers accessing the wireless channel for transmitting until a predetermined time interval, and wherein, if the correlation peaks are not greater than the predetermined threshold, determining that the received signal operates at the predefined bandwidth of the wireless device and the wireless device prepares to access the wireless channel for transmitting.

In Example 62, the subject matter of Example 61 may optionally include that the received signal comprises a 2 MHz bandwidth signal while in Example 63, the subject matter of Example 61 may optionally provide that the predefined bandwidth of the wireless device is 1 MHz. In addition, in Example 64, the subject matter of Example 61 may optionally include that the filtering of the signal comprises band-limiting the 2 MHz bandwidth signal to a 1 MHz bandwidth.

In Example 65, the subject matter of Example 61 may optionally include that the correlating mechanism comprises correlating the filtered signal against a 32 μsec delayed conjugated version of the filtered signal and in Example 66, that averaging logic of the correlated filtered signal is performed over a 4 μsec window.

In Example 67, the subject matter of Example 61 may optionally provide that the correlated peaks being greater than the predetermined threshold indicate that the received signal comprises an orthogonal frequency division multiplexing (OFDM) signal having cyclic prefixes (CPs) as guard intervals (GIs) and in Example 68, the subject matter of Example 67 may in turn optionally provide that the predetermined threshold comprises a first value for a long GI and a second value for a short GI.

Example 69 is a computer-readable medium comprising computer-readable instructions physically embodied thereon which, when executed by a processor, causes the processor to perform the method of any of claims 53-60.

Example 70 is an apparatus comprising means for performing the method of claims 53-60.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. In addition, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

Furthermore, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, as the following claims reflect, inventive embodiments lie in less than all features of a single foregoing disclosed embodiment. Thus, the claims following the detailed description are hereby expressly incorporated into this detailed description.

What is claimed is:

1. A method of mitigating collisions between wireless transmissions operating at different bandwidths, comprising:
    receiving a signal across a wireless channel by a wireless device operating at a predefined bandwidth;
    filtering the received signal to generate a band-limited filtered signal at the predefined bandwidth of the wireless device;
    correlating the band-limited filtered signal with a delayed, conjugated version of the band-limited filtered signal;
    performing a moving average of the correlated filtered signals to determine correlation peaks;
    comparing the correlation peaks with a predetermined threshold; and
    determining that the received signal operates at a wider bandwidth than the predefined bandwidth of the wireless device, if the correlation peaks are greater than the predetermined threshold,
    wherein, upon determining that the received wireless signal operates at the wider bandwidth, the wireless device defers accessing the wireless channel for transmitting until a predetermined time interval.

2. The method of claim 1 further comprising determining that the received signal operates at the predefined bandwidth of the wireless device, if the correlated peaks are not greater than the predetermined threshold.

3. The method of claim 2, wherein the wireless device prepares to access the wireless channel for transmitting, upon determining that the received signal operates at the predefined bandwidth of the wireless device.

4. The method of claim 1, wherein the received signal comprises a 2 MHz bandwidth signal.

5. The method of claim 1, wherein the predefined bandwidth of the wireless device is 1 MHz.

6. The method of claim 4, wherein the filtering of the signal comprises band-limiting the 2 MHz bandwidth signal to a 1 MHz bandwidth.

7. The method of claim 1, wherein the correlating comprises correlating the filtered signal against a 32 μsec delayed conjugated version of the filtered signal.

8. The method of claim 1, wherein the moving average of the correlated filtered signal is performed over a 4 μsec window.

9. The method of claim 1, wherein the correlated peaks being greater than the predetermined threshold indicate that the received signal comprises an orthogonal frequency division multiplexing (OFDM) signal having cyclic prefixes (CPs) as guard intervals (GIs).

10. The method of claim 9, wherein the predetermined threshold comprises a first value for a long GI and a second value for a short GI.

11. A wireless system for mitigating collisions between wireless transmissions operating at different bandwidths, comprising:
a wireless device configured to operate at a predefined bandwidth, the wireless device including:
a transceiver configured to receive a signal across a wireless channel;
a filter configured to filter the receive signal and generate a band-limited filtered signal at the predefined bandwidth of the wireless device;
a correlating mechanism configured to correlate the band-limited filtered signal with a delayed, conjugated version of the band-limited filtered signal;
logic configured to perform a moving average of the correlated filtered signals to determine correlation peaks; and
logic configured to compare the correlation peaks with a predetermined threshold,
wherein, if the correlation peaks are greater than the predetermined threshold, the received signal is determined to operate at a wider bandwidth than the predefined bandwidth of the wireless device, and
wherein, upon determining that the received wireless signal operates at the wider bandwidth, the wireless device defers accessing the wireless channel for transmitting until a predetermined time interval.

12. The wireless system of claim 11 wherein, if the correlated peaks are not greater than the predetermined threshold, determining that the received signal operates at the predefined bandwidth of the wireless device.

13. The wireless system of claim 12, wherein the wireless device prepares to access the wireless channel and transmits, upon determining that the received signal operates at the predefined bandwidth of the wireless device.

14. The wireless system of claim 11, wherein the received signal comprises a 2 MHz bandwidth signal.

15. The wireless system of claim 11, wherein the predefined bandwidth of the wireless device is 1 MHz.

16. The wireless system of claim 14, wherein the filter band-limits the 2 MHz bandwidth signal to a 1 MHz bandwidth.

17. The wireless system of claim 11, wherein the correlating mechanism comprises correlating the filtered signal against a 32 µsec delayed conjugated version of the filtered signal.

18. The wireless system of claim 11, wherein the averaging logic of the correlated filtered signal is performed over a 4 µsec window.

19. The wireless system of claim 1, wherein the correlated peaks being greater than the predetermined threshold indicate that the received signal comprises an orthogonal frequency division multiplexing (OFDM) signal having cyclic prefixes (CPs) as guard intervals (GIs).

20. The wireless system of claim 9, wherein the predetermined threshold comprises a first value for a long GI and a second value for a short GI.

* * * * *

UNITED STATES PATENT AND TRADEMARK OFFICE
CERTIFICATE OF CORRECTION

| | | |
|---|---|---|
| PATENT NO. | : 9,131,512 B2 | Page 1 of 1 |
| APPLICATION NO. | : 13/796389 | |
| DATED | : September 8, 2015 | |
| INVENTOR(S) | : Azizi et al. | |

It is certified that error appears in the above-identified patent and that said Letters Patent is hereby corrected as shown below:

On the title page, in item (72), in "Inventors", in column 1, line 1, delete "Shahmaz" and insert --Shahrnaz--, therefor Signed and Sealed this
Eighth Day of March, 2016

Michelle K. Lee
*Director of the United States Patent and Trademark Office*